United States Patent
Zhou et al.

(10) Patent No.: US 11,416,292 B2
(45) Date of Patent: Aug. 16, 2022

(54) SATELLITE DATA PROCESSING METHOD, APPARATUS, AND SATELLITE BACKUP SUBSYSTEM

(71) Applicant: CHENGDU STAR ERA AEROSPACE TECHNOLOGY CO., LTD., Sichuan (CN)

(72) Inventors: Shuting Zhou, Sichuan (CN); Long Wang, Sichuan (CN); Zhenbo Yuan, Sichuan (CN); Lei Wang, Sichuan (CN)

(73) Assignee: CHENGDU STAR ERA AEROSPACE TECHNOLOGY CO., LTD.

( * ) Notice: Subject to any disclaimer, the term of this patent is extended or adjusted under 35 U.S.C. 154(b) by 0 days.

(21) Appl. No.: 17/419,703

(22) PCT Filed: May 26, 2020

(86) PCT No.: PCT/CN2020/092405
§ 371 (c)(1),
(2) Date: Jun. 29, 2021

(87) PCT Pub. No.: WO2021/103451
PCT Pub. Date: Jun. 3, 2021

(65) Prior Publication Data
US 2022/0043674 A1 Feb. 10, 2022

(30) Foreign Application Priority Data
Nov. 29, 2019 (CN) .......................... 201911210337.4

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
CPC .......................... G06F 9/4881; H04Q 11/0003
See application file for complete search history.

(56) References Cited

U.S. PATENT DOCUMENTS

| 9,684,563 B1 | 6/2017 | Wartnick |
| 10,749,959 B2 * | 8/2020 | Coleman ............. G06F 9/45558 |

(Continued)

FOREIGN PATENT DOCUMENTS

| CN | 103679352 A | 3/2014 |
| CN | 103744733 A | 4/2014 |

(Continued)

OTHER PUBLICATIONS

Chinese Office Action corresponding to CN201911210337.4 dated Jun. 9, 2020.

(Continued)

*Primary Examiner* — Wissam Rashid
(74) *Attorney, Agent, or Firm* — Barnes & Thornburg LLP

(57) ABSTRACT

A satellite data processing method, apparatus, and a satellite backup subsystem belongs to the technical field of satellites. This method is applied to the satellite backup subsystem. The method comprises: receiving a data task, wherein the data task comprises data backup or data restoration; splitting the data task into a plurality of single-orbit tasks; and executing respective single-orbit task in each orbital flight.

18 Claims, 2 Drawing Sheets

(56) References Cited

U.S. PATENT DOCUMENTS

| | | | |
|---|---|---|---|
| 10,812,880 B2 * | 10/2020 | Damaghi | H04J 14/02 |
| 2011/0175723 A1 | 7/2011 | Ko et al. | |
| 2015/0261243 A1 | 9/2015 | Williams et al. | |
| 2017/0034250 A1 * | 2/2017 | Sobhani | H04B 7/18521 |

FOREIGN PATENT DOCUMENTS

| | | |
|---|---|---|
| CN | 1043488886 A | 2/2015 |
| CN | 106324631 A | 1/2017 |
| CN | 106502837 A | 3/2017 |
| CN | 106888047 A | 6/2017 |
| CN | 107862145 A | 3/2018 |
| CN | 108053051 A | 5/2018 |
| CN | 108897021 A | 11/2018 |
| CN | 109992387 A | 7/2019 |
| CN | 110968459 A | 4/2020 |

OTHER PUBLICATIONS

Chinese Office Action corresponding to CN201911210337.4 dated Sep. 9, 2020.
International Search Report and Written Opinion corresponding to PCT/CN2020/092405 dated Aug. 26, 2020.
Notification to Grant Patent Right for Invention corresponding to CN201911210337.4 dated Nov. 19, 2020.
First Search of Priority Document corresponding to CN201911210337.4.
Second Search of Priority Document corresponding to CN201911210337.4.

* cited by examiner

SATELLITE DATA PROCESSING METHOD, APPARATUS, AND SATELLITE BACKUP SUBSYSTEM

CROSS-REFERENCE TO RELATED APPLICATION

The present disclosure claims the benefit of priority to International Patent Application no. PCT/CN2020/092405, filed on May 26, 2020, and to the Chinese patent application filed with the Chinese Patent Office on Nov. 29, 2019 with the filing No. 2019112103374, and entitled "Satellite Data Processing Method, Apparatus, and Satellite Backup Subsystem", all the contents of each of which are incorporated herein by reference in their entirety, including but without limitation, those portions concerning satellite-related operations.

TECHNICAL FIELD

The present disclosure relates to the technical field of satellites, and in particular, provides a satellite data processing method and apparatus, and a satellite backup subsystem.

BACKGROUND ART

In the operation process of device on satellites, situations such as abnormal power-down caused by cosmic ray irradiation or the like may occur, and when the device on the satellites is in the above situations, data storage errors may occur, and data storage errors may directly cause the device to fail to operate normally.

In order to enable the device on satellites to be capable of operating normally again, some solutions are provided so as to solve the above problems. One way is to restart the device on the satellites in a hot backup manner, wherein the principle of the hot backup is that at least two identical pieces of hardware are placed on the satellites, each piece of hardware is installed therein with the same system, and the system on each piece of hardware is synchronized to do the same thing, then if one piece of hardware fails, switch to the other. However, in this manner, the host backup has a high cost, a plurality of pieces of hardware are needed, and the power consumption is also high, but the electric quantity on the satellites is quite limited, and once the electric quantity is exhausted, the satellites cannot be used.

Another way is to restart the device on the satellite in a manner of system restoration, which enables the presently running system to be restored to an initial state of the system. However, if the manner of system restoration is adopted, firstly, if the presently running system has updated the version through a satellite data transmission uplink during use, adopting the manner of system restoration only can restore the system to the initial state, but in the process of restoring the system to the initial state, and in the process of updating the system in the initial state to the system running before the restoration, the normal execution of satellite task certainly will be affected; and secondly, in the process of system restoration, due to the large data volume, the time taken is also long, and if an abnormal condition such as power-down occurs in the process, the restoration may be failed, thereby resulting in more time cost for restoration and recovery.

SUMMARY

An objective of the present disclosure lies in providing a satellite data processing method, a satellite data processing apparatus, and a satellite backup subsystem, so as to solve some problems existing in the backup schemes adopted by the device on satellites.

In order to achieve the above objective, a technical solution adopted in the present disclosure is as follows.

Embodiments of the present disclosure provide a satellite data processing method, applicable to a satellite backup subsystem, wherein the method includes: receiving a data task, wherein the data task includes data backup or data restoration; splitting the data task into a plurality of single-orbit tasks; and executing respective single-orbit task in each orbital flight.

In embodiments of the present disclosure, the technical solution of breakpoint backup or breakpoint restoration is adopted to split a complete data task into a plurality of single-orbit tasks and execute the same in orbits, so as to realize backup or restoration of the satellite on-orbit system, further solving the problem that some other backup modes cannot realize the on-orbit backup or restoration operation.

Optionally, as a possible implementation, the step of splitting the data task into a plurality of single-orbit tasks includes: acquiring a total duration required to execute the data task; estimating a duration allowed to execute the data task in one orbital flight of the satellite; and splitting the data task into a plurality of single-orbit tasks based on the total duration and the duration allowed to execute the data task in one orbital flight of the satellite.

In embodiments of the present disclosure, the task may be quickly split into a plurality of single-orbit tasks according to the total duration of executing the data task and the estimated duration allowed to execute the data task in one orbital flight of the satellite, thereby simplifying the splitting process.

Optionally, as a possible implementation, the step of estimating a duration allowed to execute the data task in one orbital flight of the satellite includes: estimating the duration allowed to execute the data task in one orbital flight of the satellite, according to an average value of durations for executing the data backup or the data restoration in each orbital flight of the satellite at a plurality of historical moments.

Optionally, as a possible implementation, the step of splitting the data task into a plurality of single-orbit tasks includes: splitting the data task into a plurality of single-orbit tasks, according to the duration allowed to execute the data task in each orbital flight and a remaining data task amount of the data task.

In embodiments of the present disclosure, according to the duration allowed to execute the data task in each orbital flight and the remaining data task amount of the data task, the data task is split into a plurality of single-orbit tasks, so that when the data task is split into a plurality of single-orbit tasks, the difference between the durations allowed to execute the data task in different orbital flights can be sufficiently considered, then resources can be more reasonably used, so that the splitting effect is more efficient.

Optionally, as a possible implementation, the step of splitting the data task into a plurality of single-orbit tasks, according to the duration allowed to execute the data task in each orbital flight and a remaining data task amount of the data task includes: determining the duration allowed to execute the data backup or data restoration operation in present orbital flight according to electric quantity of the satellite and the remaining data task amount to be backed-up or restored in the last/previous orbital flight; calculating the duration required by the remaining data task of the data task; judging whether the duration allowed to execute the data backup or data restoration operation in the present orbital flight is less than the duration required by the remaining data task amount of the data task, wherein if the duration allowed to execute the data backup or data restoration operation in the present orbital flight is less than the duration required by the remaining data task of the data task, the remaining data of the data task is split into a single-orbit task that needs to be executed in the present orbital flight and a data task remaining after subtracting the single-orbit task that needs to be executed in the present orbital flight, according to the duration allowed to execute the data backup or data restoration operation in the present orbital flight; and if the duration allowed to execute the data backup or data restoration operation in the present orbital flight is not less than the duration required by the remaining data task of the data task, the single-orbit task that needs to be executed in the present orbital flight is the remaining data task of the data task.

In embodiments of the present disclosure, the remaining data task of the data task is split according to the duration for executing the data backup or data restoration operation in the present orbital flight determined in the last orbit, and the calculated duration required by the remaining data task of the data task, so that electric energy of a storage battery may be used sufficiently and reasonably, thus avoiding waste of resource.

Optionally, as a possible implementation, the step of executing respective single-orbit task includes: recording a start flag bit of the data backup or the data restoration in the presently executed single-orbit task; executing the data backup or the data restoration in the single-orbit task, from the start flag bit of the data backup or the data restoration in the single-orbit task; and recording, when completing execution of the data backup or the data restoration in the corresponding single-orbit task, an end flag bit when the execution is completed.

In embodiments of the present disclosure, the technical means of breakpoint backup or breakpoint restoration are adopted, the start flag bit for executing the data backup or the data restoration in a single-orbit task is recorded in the present orbital flight, and the end flag bit is recorded when the execution is completed, so that when the data backup or the data restoration in the single-orbit task is executed in the next orbital flight, there are traces to follow to realize the backup or restoration of the satellite on-orbit system, further solving the problems existing in some other backup modes.

Optionally, as a possible implementation, the step of recording a start flag bit of the data backup or the data restoration in the presently executed single-orbit task includes: checking in a file whether an end flag bit of data backup or data restoration representing a nearest time point to the present orbital flight is recorded, wherein if the end flag bit of data backup or data restoration representing the nearest time point to the present orbital flight is recorded in the file, the start flag bit of the presently executed data backup or data restoration starts to be recorded from the corresponding end flag bit in the last time; and if the end flag bit of data backup or data restoration representing the nearest time point to the present orbital flight is not recorded in the file, the start flag bit of the presently executed data backup or data restoration is recorded.

In an embodiment of the present disclosure, if the end flag bit of data backup or restoration representing the nearest time point to the present orbital flight is recorded in the file, the start flag bit of the presently executed data backup or data restoration starts to be recorded from the end flag bit, if the end flag bit representing that the last/previous operation is completed is not recorded in the file, the start flag bit of the presently executed data backup or data restoration starts to be recorded from the beginning, so as to improve the reliability of the device, and alternatively, the start flag bit of the presently executed data backup or data restoration starts to be recorded from the end flag bit corresponding to the time before last time, so as to save the time for backup or restoration.

Optionally, as a possible implementation, the step of receiving a data task includes: receiving a data task instruction from the ground station, wherein the data task instruction carries a device identifier, and the device identifier is used to indicate a device on which the data task is to be executed; sending to the ground station an inquiry request whether there is a need to execute the data task on the device corresponding to the device identifier; and indicating that the data task is received, when receiving a confirmation instruction sent by the ground station in response to the inquiry request.

In an embodiment of the present disclosure, when the data task instruction from the ground station is received, the satellite backup subsystem determines that the data task is received by sending the inquiry request to the ground station and receiving the confirmation instruction, and then executes the data backup or restoration, which can reduce the risk of misoperation.

Optionally, as a possible implementation, in the process of executing the single-orbit task, the method further includes: stopping execution of the current single-orbit task when it is monitored that a power supply voltage continuously falls or falls to a set threshold.

In an embodiment of the present disclosure, when it is monitored that the power supply voltage continuously falls or falls to a set threshold, execution of the current single-orbit task is stopped, so as to avoid hardware damage to the standby memory.

An embodiment of the present disclosure further provides a satellite data processing method, applicable to a ground station, wherein the method includes: sending a data task instruction to a satellite, wherein the data task instruction carries a device identifier, and the device identifier is used to indicate a device on which the data task is to be executed; receiving an inquiry request whether there is a need to execute the data task on the device corresponding to the device identifier sent by the satellite in response to the data task instruction, wherein the inquiry request carries a total duration required to execute the data task on the device corresponding to the device identifier; and sending a confirmation instruction to the satellite, so that the satellite backup subsystem in the satellite executes, according to a single-orbit sub-duration carried in the confirmation instruction, the single-orbit task corresponding to the single-orbit sub-duration in orbits, wherein the confirmation instruction carries a plurality of single-orbit sub-durations, each single-orbit sub-duration represents the duration allowed to execute the data task in one orbital flight of the satellite, and the sum of the plurality of single-orbit sub-durations is equal to the total duration.

In an embodiment of the present disclosure, the total duration required to execute the data backup or the data restoration on the device corresponding to the device identifier is carried in the inquiry request, so that the ground station divides the duration for executing the data backup or the data restoration in each orbit according to the total duration, and the plurality of single-orbit sub-durations divided are carried in the confirmation instruction and sent to the satellite subsystems of the satellite, so that the satellite subsystems may execute the corresponding operation directly according to the divided single-orbit sub-durations, which may save the energy consumption of the satellite.

An embodiment of the present disclosure further provides a satellite backup subsystem, including a standby memory and a processor, wherein the standby memory is connected with the processor; the standby memory is configured to store backup data; and the processor is configured to receive a data task, wherein the data task includes data backup or data restoration; and the processor is further configured to split the data task into a plurality of single-orbit tasks; and in each orbital flight, the processor is configured to execute respective single-orbit tasks, so as to back up data in a memory corresponding to a device on which the data task is to be executed to the standby memory, or restore the backup data in the standby memory to the memory.

An embodiment of the present disclosure further provides a satellite data processing apparatus, applicable to a ground station, wherein the apparatus includes: a first sending module, configured to receive a data task instruction from a ground station, wherein the data task instruction carries a device identifier, and the device identifier is configured to indicate a device on which the data task is to be executed; a receiving module, configured to receive an inquiry request whether there is a need to execute the data task on the device corresponding to the device identifier sent by the satellite in response to the data task instruction, wherein the inquiry request carries a total duration required to execute the data task on the device corresponding to the device identifier; and a second sending module, configured to send a confirmation instruction to the satellite, so that the satellite backup subsystem in the satellite executes, according to a single-orbit sub-duration carried in the confirmation instruction, the single-orbit task corresponding to the single-orbit sub-duration in orbits, wherein the confirmation instruction carries a plurality of single-orbit sub-durations, each single-orbit sub-duration represents the duration allowed to execute the data task in one orbital flight of the satellite, and the sum of the plurality of single-orbit sub-durations is equal to the total duration. An embodiment of the present disclosure further provides a satellite backup subsystem, including a standby memory and a processor, wherein the standby memory is connected with the processor; the standby memory is configured to store backup data; and the processor has a computer program solidified therein, and the processor is configured to execute the above satellite data processing method by running the computer program.

An embodiment of the present disclosure further provides a computer readable storage medium, wherein the readable storage medium is stored thereon with a computer program, and the computer program, when run by a processor, executes the above satellite data processing method.

An embodiment of the present disclosure further provides a computer program product, wherein the computer program product, when running on a computer, enables the computer to execute the above satellite data processing method.

DETAILED DESCRIPTION OF EMBODIMENTS

Figure 1:
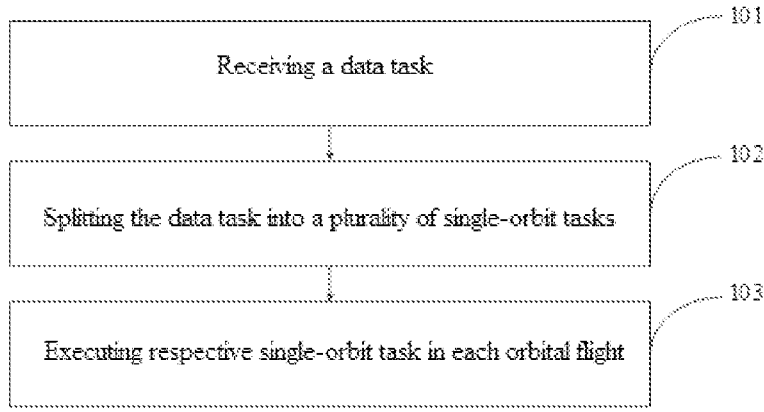
FIG. 1 shows a schematic flowchart of a satellite data processing method applied to a satellite backup subsystem provided in an embodiment of the present disclosure.

The technical solutions in the embodiments of the present disclosure will be described below in conjunction with accompanying drawings in the embodiments of the present disclosure.

It should be noted that similar reference signs and letters represent similar items in the following accompanying drawings, therefore once a certain item is defined in one accompanying drawing, it is not needed to be further defined or explained in subsequent accompanying drawings. Meanwhile, in the description of the present disclosure, relational terms such as "first" and "second" are merely for distinguishing one entity or operation from another entity or operation, while it is not necessarily required or implied that these entities or operations have any such practical relation or order. Moreover, terms "including", "containing" or any other derivatives thereof are intended to be non-exclusive, thus a process, method, article or device including a series of elements not only include those elements, but also include other elements that are not listed definitely, or further include elements inherent to such process, method, article or device. Without more restrictions, an element defined with wordings "including a . . . " does not exclude presence of other same elements in the process, method, article or device including said element.

Moreover, the term "and/or" in the present disclosure is merely an association relationship describing associated objects, and indicates that there may be three relationships, for example, A and/or B may indicate that A exists alone, A and B exist simultaneously, and B exists alone.

Given the drawbacks of some backup schemes adopted for data backup of satellites, an embodiment of the present disclosure provides a satellite data processing method, wherein the technical means of breakpoint backup and breakpoint restoration are adopted so as to realize on-orbit system backup or restoration of the satellite, in turn, the problems existing in some backup modes are solved, for example, some system backup schemes can only restore the system to an initial state, but if the state of the system changes midway, the requirement cannot be satisfied.

On the whole, the on-orbit system backup refers to that after a device runs for a period of time, if the current state satisfies the backup requirement, the current state is set as a restoration point and data backup is performed by means of on-orbit backup, and if a failure occurs later, the system can be just restored to the backed-up restoration point.

The satellite is typically powered by an energy storage battery and a solar panel that converting solar energy in the process of flying around the earth. However, the electric quantity of the energy storage battery is determined when the satellite is launched, therefore, the electric quantity of the energy storage battery is limited, and the electric energy converted from solar energy by the solar panel is also limited, for example, when the satellite is on a light-facing surface, the solar panel can receive the solar energy; but when the satellite is on a shady surface, the solar energy cannot be received, or quite little solar energy is received. In addition, a deployment area of the solar panel carried on the satellite and the conversion rate of the solar panel are both limited, therefore, the power on the satellite is limited.

Taking Cube-sat as an example, the satellite generally needs about 90 minutes to orbit one turn (completing flight of one orbit), and in order to save the limited power on the satellite, power-on period for the satellite to orbit one turn is generally 10-40 minutes. During the period of 10-40 minutes, the routine task of the satellite needs to be completed first, then the remaining time can be used to perform backup work such as restoration, but the remaining time usually is not enough to fulfill a complete backup or restoration, which thus may result in backup failure.

Therefore, the present disclosure adopts the solution of breakpoint backup and breakpoint restoration to realize the on-orbit system backup or restoration of satellite, to put it simply, the backup and restoration tasks are divided into a plurality of single-orbit tasks, and one single-orbit task is executed in one orbital flight (each orbit).

Referring to FIG. 1, it shows a satellite data processing method applied to a satellite backup subsystem in a satellite provided in an embodiment of the present disclosure, and execution of steps contained therein will be illustrated in conjunction with FIG. 1.

Step 101: receiving a data task.

In some possible embodiments, when the data task needs to be executed on a certain device on the satellite, a data task instruction may be sent by a ground station to the satellite, and upon reception of the data task instruction, a satellite backup subsystem executes a subsequent operation, for example, acquiring a total duration required to execute a complete data task. In the above, the data task may include data backup or data restoration.

The satellite backup subsystem may execute the subsequent operation when receiving the data task from the ground station, for example, in the above example, upon reception of the data task from the ground station, the satellite backup subsystem acquires the total duration required to execute a complete data task.

Certainly, in some other possible embodiments of the present disclosure, in order to avoid misoperation, the satellite backup subsystem further may send, upon reception of the data task instruction, to the ground station an inquiry request whether there is a need to execute the data task on the device corresponding to a device identifier carried in the data task instruction, and after receiving a confirmation instruction sent by the ground station in response to the inquiry request, the satellite backup subsystem determines that the received data task may be executed, so as to execute the subsequent operation. In the above, the data task instruction may carry the device identifier, and the device identifier may be used to indicate the device on which the data task is to be executed.

In addition, the satellite backup subsystem may send state parameters of the satellite to the ground station, wherein the state parameters may contain operation parameters of the device on the satellite; and after the device on the satellite operates for a period of time, the ground station may send, if the current state meets the backup requirement, a data backup instruction to the satellite. For example, when a system has been running for a preset period of time (for example, 2 months) without failure, it indicates that the current state is relatively stable, and then it can be backed up. In addition, data backup may also be performed on the device regularly, for example, the backup is carried out at fixed time intervals (for example, 2 months).

Step 102: splitting the data task into a plurality of single-orbit tasks.

The satellite backup subsystem may split the received data task into a plurality of (two or more) single-orbit tasks.

In the above, as a possible embodiment, the satellite backup subsystem may split the data task into a plurality of (two or more) single-orbit tasks that may be completed for multiple times; for example, the satellite backup subsystem may split the data task into a plurality of single-orbit tasks according to the duration allowed to execute the data task in each orbital flight and remaining data task amount of the data task.

In the above, the satellite backup subsystem may determine the duration allowed to execute the data task in each orbital flight according to the following rules; for example, the satellite backup subsystem may determine the duration allowed to execute the data backup or the data restoration in the present orbital flight according to the electric quantity of the satellite and the remaining data task amount to be backed-up or restored in the last orbital flight; then, the satellite backup subsystem may determine the duration allowed to execute the data backup or the data restoration in the next orbital flight, according to the electric quantity of the satellite and the remaining data task amount to be backed-up or restored in the present orbital flight; when splitting the task, the satellite backup subsystem may calculate the duration required by the remaining data task of the data task, and judge whether the duration allowed to execute the data backup or data restoration operation in the present orbital flight is less than the duration required by the calculated remaining data task amount of the data task; if the duration allowed to execute the data backup or data restoration operation in the present orbital flight is less than the duration required by the remaining data task of the data task, the satellite backup subsystem may split the remaining data of the data task into a single-orbit task that needs to be executed in the present orbital flight and the data task remaining after subtracting the single-orbit task that needs to be executed in the present orbital flight, according to the duration allowed to execute the data backup or data restoration operation in the present orbital flight; if the duration allowed to execute the data backup or data restoration operation in the present orbital flight is not less than (greater than or equal to) the duration required by the remaining data task of the data task, the single-orbit task that needs to be executed in the present orbital flight is the remaining data task of the data task.

For example, in the (N−1)th orbital flight, the duration allowed to execute the data backup or data restoration operation in the N-th orbital flight is determined to be 20 minutes, then in the N-th orbital flight, if the satellite backup subsystem calculates that the duration required to execute the remaining data task amount of the data task is about 30 minutes, as the duration (20 minutes) allowed to execute the data backup or data restoration operation in the N-th orbital flight is less than the duration (30 minutes) required by the backup or restoring the remaining data task amount, in the N-th orbital flight, the satellite backup subsystem may split the remaining data of the data task into a single-orbit task that needs to be executed in the present (N-th) orbital flight and a data task remaining after subtracting the single-orbit task that needs to be executed in the present (N-th) orbital flight; in the (N+1)th orbital flight, assuming that the duration allowed to execute the data backup or data restoration operation in the (N+1)th orbital flight is 15 minutes, at this time, as the duration required to execute the remaining data task amount of the data task is 10 minutes, less than the duration (15 minutes) allowed to execute the data backup or data restoration operation in the present ((N+1)th) orbital flight, the single-orbit task that needs to be executed in the present ((N+1)th) orbital flight is the remaining data task of the data task, that is, the splitting is completed.

Besides, as a further possible embodiment, the satellite backup subsystem may split the data task into a plurality of single-orbit tasks in one time, that is, when the data backup or the data restoration is about to start to be executed, the data task is split into a plurality of single-orbit tasks.

For example, in some possible embodiments, the satellite backup subsystem may split the data task into a plurality of single-orbit tasks based on the total duration required to execute the data task and the estimated duration allowed to execute the data task in one orbital flight of the satellite. For example, it is assumed that the total duration required by a complete data task for a certain device on the satellite is 65 minutes, and the estimated duration allowed to execute the data task in one orbital flight of the satellite is 15 minutes, the satellite backup subsystem may split the data task into 5 single-orbit tasks based on the total duration (65 minutes) and the estimated duration (15 minutes) allowed to execute the data task in one orbital flight of the satellite, wherein sub-durations corresponding to first four single-orbit tasks are all 15 minutes, and the sub-duration corresponding to the last single-orbit task is 5 minutes.

Besides, as a possible embodiment, the satellite backup subsystem may estimate the duration allowed for executing the data task in one orbital flight of the satellite according to an average value of durations used to execute the data backup or the data restoration in each orbital flight of the satellite at a plurality of historical moments.

For example, the satellite backup subsystem may estimate the duration allowed for executing the data task in one orbital flight of the satellite according to an average value of the durations used to execute the data backup or the data restoration in the first five orbits. Certainly, in some other implementations of the embodiments of the present disclosure, the satellite backup subsystem may also estimate the duration allowed for executing the data task in one orbital flight of the satellite according to the current electric quantity of the satellite.

Besides, it should be noted that in addition to being completed by the satellite backup subsystem, the single-orbit task (single-orbit sub-duration) may also be divided by the ground station (satellite platform). For example, when the satellite receives the data task instruction sent by the ground station, the satellite backup subsystem may acquire the device identifier carried in the data task instruction, so as to determine the total duration required to execute a complete data backup task or restoration task on the device corresponding to the device identifier, and perform a single-orbit duration division.

Moreover, in order to avoid misoperation, when the satellite receives the data task instruction sent by the ground station, the satellite backup subsystem may send to the ground station the inquiry request whether there is a need to execute the data backup or the data restoration on the device corresponding to the device identifier carried in the instruction, and execute, after receiving the confirmation instruction sent by the ground station in response to the inquiry request, the corresponding backup or restoration operation.

In the above, the task division may be completed by the satellite backup subsystem, or by a main system of the satellite, and then the main system sends a plurality of divided single-orbit tasks to the satellite backup subsystem. The satellite backup subsystem may realize information interaction with the ground station based on a communication module (such as a Beidou communication module) of the satellite main system, for example, when receiving the instruction from the ground station, the satellite main system may forward the instruction to the satellite backup subsystem, and when the satellite backup subsystem needs to send the inquiry request to the ground station, the inquiry request may be sent to the satellite main system, and then the inquiry request is sent by the satellite main system to the ground station.

In some possible embodiments, if the task division is completed by the ground station, when the satellite receives the data task instruction sent by the ground station, the satellite backup subsystem may acquire the device identifier carried in the data task instruction, determine the total duration required to execute a complete data backup task or restoration task on the device corresponding to the device identifier, and send, in response to the data task instruction, to the ground station the inquiry request whether there is a need to execute the data backup or the data restoration, wherein the inquiry request carries the total duration.

After acquiring the total duration in the inquiry request, the ground station may divide the task based on the total duration, and then send the confirmation instruction to the satellite, wherein the confirmation instruction may carry a plurality of (two or more) single-orbit sub-durations, and each single-orbit sub-duration represents the duration allowed to execute the data backup or the data restoration in one orbital flight of the satellite. The sum of all the single-orbit durations is equal to the total duration. It can thus be seen that in this embodiment, the ground station may allocate the task to the satellite, and control the satellite by transmitting an instruction to the satellite.

It should be noted that when the task division is completed by the satellite, after the satellite backup subsystem receives the data task instruction sent by the ground station, the inquiry request sent to the ground station may not carry the total duration required to execute a complete data backup task or a restoration task on the device corresponding to the device identifier. When the task division is completed by the ground station, the inquiry request needs to carry the total duration, and correspondingly, the confirmation instruction returned by the ground station at this time carries at least two single-orbit sub-durations.

Step 103: executing respective single-orbit task in each orbital flight.

Figure 2:
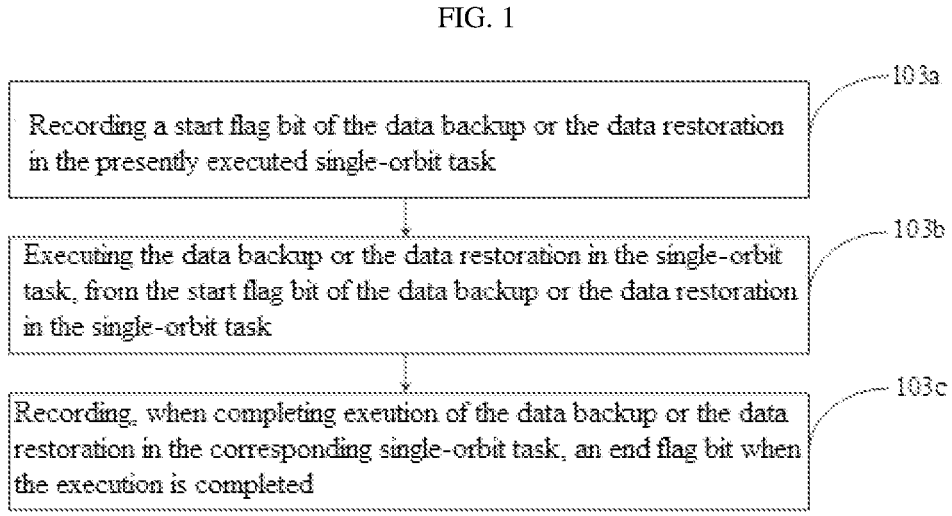
FIG. 2 shows a schematic flowchart of executing a single-orbit task each time according to an embodiment of the present disclosure.

In combination with the plurality of single-orbit tasks obtained in the above, the satellite backup subsystem may execute the single-orbit task corresponding to each orbit in each orbital flight. For ease of understanding, executing the single-orbit task corresponding to each orbit in each orbital flight is illustrated in combination with the flowchart for executing the single-orbit task each time shown in FIG. 2.

Step 103a: recording a start flag bit of the data backup or the data restoration in the presently executed single-orbit task.

The satellite backup subsystem may record the start flag bit of the data backup or the data restoration in the presently executed single-orbit task when presently executing the data backup or the data restoration in the single-orbit task.

In the above, as a possible embodiment, when recording the start flag bit of the presently executed data backup or data restoration, the satellite backup subsystem may firstly check in a file whether an end flag bit of data backup or restoration representing the nearest time point to the present orbital flight is recorded, wherein if the end flag bit of data backup or data restoration representing the nearest time point to the present orbital flight is recorded in the file (if yes), the satellite backup subsystem may start to record the start flag bit of the presently executed data backup or data restoration from the corresponding end flag bit in the last time; if the end flag bit of data backup or data restoration representing the nearest time point to the present orbital flight is not recorded in the file (if no), the satellite backup subsystem may record the start flag bit of the presently executed data backup or data restoration. For example, the satellite backup subsystem may start to record the start flag bit of the presently executed data backup or data restoration from the start flag bit corresponding to the first time, and alternatively, the satellite backup subsystem may start to record the start flag bit of the presently executed data backup or data restoration from the end flag bit corresponding to the time before last time.

In some possible embodiments, in the process that the satellite backup subsystem records the start flag bit of the data backup or the data restoration in the presently executed single-orbit task, if an end flag bit of data backup or restoration representing the nearest time point (last time) to the present orbital flight is recorded in the file, that is, when the end flag bit of the data backup or the data restoration representing that the last orbital flight is completed is recorded in the file, it means that the last backup or restoration is successful, then the satellite backup subsystem may start to record the start flag bit of the presently executed data backup or data restoration from the corresponding end flag bit in the last time; if the end flag bit of the data backup or restoration representing the nearest time point to the present orbital flight is not recorded in the file, that is, the end flag bit of the data backup or restoration representing that the last orbital flight is completed is not recorded in the file, it means that the last backup or restoration fails. As a possible embodiment, the satellite backup subsystem may back up or restore again from the beginning, so as to improve the reliability, and at this time, the satellite backup subsystem may start to record, from the start flag bit corresponding to the first time, the start flag bit for presently executed data backup or data restoration.

It may be understood that, as some other possible implementations of the embodiments of the present disclosure, the satellite backup subsystem may also start to execute the data backup or the data restoration from the end flag bit corresponding to the time before last time, so as to save the time required for re-backup or restoration from the beginning, and at this time, the start flag bit of the presently executed data backup or data restoration starts to be recorded from the end flag bit corresponding to the time before last time.

Step 103b: executing the data backup or the data restoration in the single-orbit task, from the start flag bit of the data backup or the data restoration in the single-orbit task.

In the process of the data backup or the data restoration in the presently executed single-orbit task, the satellite backup subsystem may execute, after recording the start flag bit of the data backup or the data restoration in the presently executed single-orbit task, the data backup or the data restoration according to the duration allowed to execute the data backup or the data restoration in the present single-orbit task from this start flag bit.

Step 103c: recording, when completing the data backup or the data restoration in the corresponding single-orbit task, an end flag bit when the execution is completed.

In some possible implementations, when completing the data backup or the data restoration in the corresponding single-orbit task, that is, when the duration for executing the data backup or the data restoration reaching the duration allowed to execute the data backup or the data restoration in the present single-orbit task, the satellite backup subsystem may record the end flag bit when the task is completed, and end the present task. In this way, when the data backup or the data restoration is to be executed next time, the satellite backup subsystem may first check in the file whether the end flag bit representing that the last backup is completed is recorded, and if yes, the present data backup or data restoration starts to be executed from the end flag bit representing that the last backup is completed.

For ease of understanding, the execution of the data backup is taken as an example; when the satellite backup subsystem executes the single-orbit backup task for the first time, the satellite backup subsystem may record the start flag bit in the file, and then backs up the data to a standby memory; when the single-orbit backup task is completed, the satellite backup subsystem may record a backup end flag bit in the file; when the single-orbit backup task is executed for the second time and thereafter, the satellite backup subsystem may first check in the file whether the end flag bit representing that the last backup is completed is recorded; if yes, the satellite backup subsystem may start to record the start flag bit from the last end flag bit, then back up the data to the standby memory, and record the end flag bit in the record file when the single-orbit backup task is completed; if no, it means that the last backup fails, then the satellite backup subsystem may start to record the start flag bit of the presently executed data backup from the start flag bit corresponding to the first time, or start to record the start flag bit of the presently executed data backup from the end flag bit corresponding to the time before last time.

In the above, when the satellite backup subsystem executes the data backup or restoration, in order to save power, all unrelated peripherals may be turned off during this period, for example, a device configured for aerial photographing is turned off, and only the power of key components such as the satellite backup subsystem is reserved, so as to speed up the restoration.

Optionally, in some possible embodiments, the satellite backup subsystem may also monitor the power supply voltage in the process of executing the single-orbit task (data backup or data restoration), and stop the current data backup or data restoration when monitoring that the power supply voltage continuously falls or falls to a set threshold.

Generally, when the device is abnormally powered down, not only data will be stored incorrectly, but more importantly a standby memory for data backup may also be damaged as a result (hardware damage on satellites will be difficult to repair). Therefore, in order to prevent hardware damage such as breakdown to the standby memory, an execution unit (processor) with a power-down detection function may be selected for corresponding execution.

In the above, the above power-down detection refers to a predetermined protection policy executed when the power supply voltage continuously falls or falls to a preset threshold, for example, stopping the execution of the current single-orbit task (data backup or data restoration), and turning off the power supply of itself.

In addition, in some other possible implementations of the embodiments of the present disclosure, an energy storage device such as capacitor for power consumption of the standby memory may be further provided, so that after the backup subsystem is abnormally powered down, the capacitor can be utilized to temporarily delay the power-off time of the standby memory, thereby protecting the standby memory, and improving the reliability of the device. When the power supply voltage continuously falls or falls to a set threshold, the execution unit generally no longer writes data into or reads data from the standby memory, and at this time, the power supply to the standby memory is not completely stopped, and the energy storage of the capacitor is reconfigured, then the power-down time of the standby memory may be effectively delayed so as to protect the standby memory.

Figure 3:
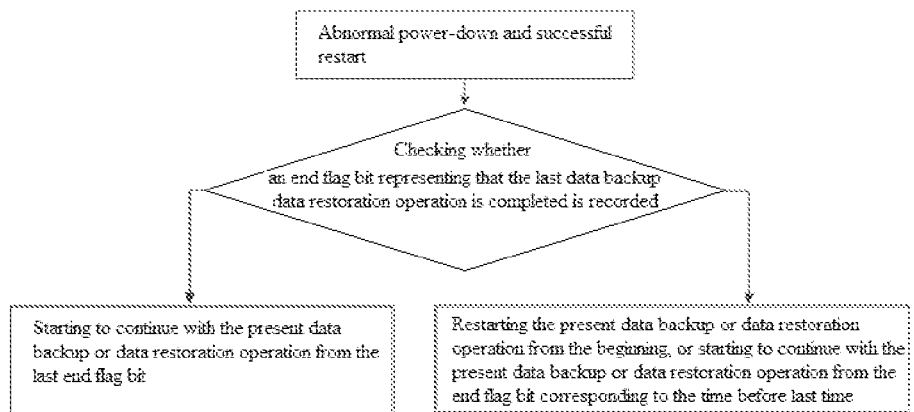
FIG. 3 shows a schematic flowchart of performing data backup or restoration operation again after abnormal power-down and restart according to an embodiment of the present disclosure.

In addition, when the satellite backup subsystem starts to execute the data backup or the data restoration after abnormal power down and restart, it may be detected whether an end flag bit representing that the data backup or the data restoration is completed last time is recorded; if yes, it indicates that the last backup or restoration is successful, then the satellite backup subsystem may start to continue with the present data backup or data restoration from the last end flag bit; if no, it indicates that the last backup or restoration fails, then the satellite backup subsystem may restart the present data backup or data restoration from the beginning, or start to continue with the present data backup or data restoration from the end flag bit corresponding to the time before last time, and the process is as shown in FIG. 3.

Figure 4:
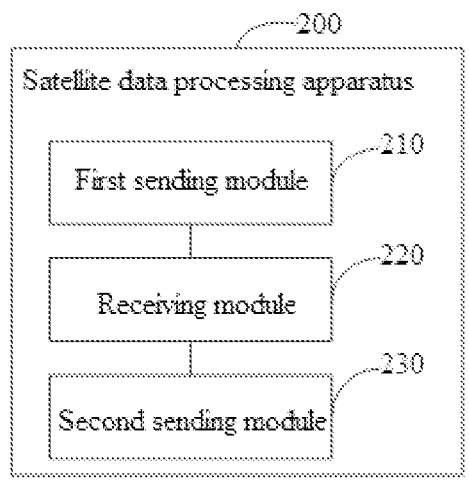
FIG. 4 shows a modular schematic view of a satellite data processing apparatus applied to a ground station according to an embodiment of the present disclosure.

In addition, based on the same inventive concept as the above satellite data processing method applied to a ground station provided in the embodiment of the present disclosure, an embodiment of the present disclosure further provides a satellite data processing apparatus 200 applied to a ground station, as shown in FIG. 4. The satellite data processing apparatus 200 may include: a first sending module 210, a receiving module 220, and a second sending module 230.

The first sending module 210 is configured to send a data task instruction to the satellite, wherein the data task instruction carries a device identifier, and the device identifier is used to indicate a device on which the data task is to be executed.

The receiving module 220 is configured to receive an inquiry request whether there is a need to execute the data task on the device corresponding to the device identifier sent by the satellite in response to the data task instruction, wherein the inquiry request carries a total duration required to execute the data backup task or the restoration task on the device corresponding to the device identifier.

The second sending module 230 is configured to send a confirmation instruction to the satellite, so that the satellite backup subsystem in the satellite executes, according to a single-orbit sub-duration carried in the confirmation instruction, the single-orbit task corresponding to the single-orbit sub-duration in orbits, wherein the confirmation instruction carries a plurality of single-orbit sub-durations, each single-orbit sub-duration represents the duration allowed to execute the data backup or the data restoration in one orbital flight of the satellite, and the sum of the plurality of single-orbit sub-durations is equal to the total duration.

The implementation principle of and the technical effects produced by the satellite data processing apparatus 200 provided in the embodiment of the present disclosure are the same as the foregoing embodiments, and for the sake of brief description, reference may be made to corresponding contents in the foregoing method embodiment for the parts not mentioned in the device embodiment.

Figure 5:
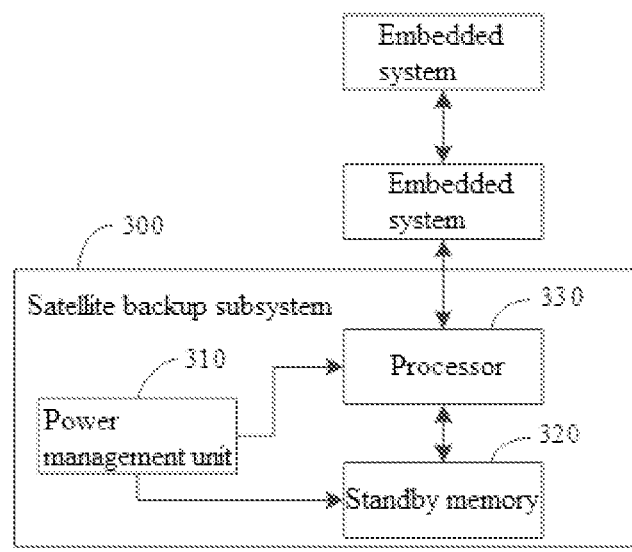
FIG. 5 is a structural schematic view of a backup subsystem provided in an embodiment of the present disclosure.

Besides, as shown in FIG. 5, FIG. 5 shows a structural block diagram of a satellite backup subsystem 300 provided in an embodiment of the present disclosure. In the above, an embedded system in the drawing may be an object to be subjected to data backup or restoration, and a system memory may be configured to store data of the embedded system. The satellite backup subsystem 300 may include: a power management unit 310, a standby memory 320, and a processor 330.

The power management unit 310 may supply power to the standby memory 320 and the processor 330. The satellite backup subsystem 300 may realize information interaction with the ground station based on a communication module (Beidou communication module) of the satellite main system, for example, when receiving the instruction from the ground station, the satellite may send the instruction to the satellite backup subsystem 300, and when the satellite backup subsystem 300 needs to send the inquiry request to the ground station, the inquiry request may be sent to the satellite main system, and then the inquiry request is sent by the satellite main system to the ground station.

The standby memory 320 may be configured to store backup data. The processor may have a system program solidified therein. In the above, the system program may include at least one system function module that may be solidified in an operating system (OS) of the satellite backup subsystem 300 in a form of system or firmware. When the processor 330 executes the system function module or a computer program included in the satellite data processing apparatus 100, the above satellite data processing method may be executed.

For example, the processor 330 may be configured to receive a data task, wherein the data task is a data backup task or a data restoration task, and may also be configured to split the data task into a plurality of single-orbit tasks, and configured to execute respective single-orbit task in each orbital flight, so as to back up data in a memory corresponding to a device on which the data task needs to be executed to a standby memory, or to restore backup data in the standby memory to the memory.

In the above, the standby memory 320 may be, but not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM) and so on.

The processor 330 may be an integrated circuit chip, with a function of processing signals. The above processor may be a general-purpose processor, including Central Processing Unit (CPU), Network Processor (NP), etc., and also may be a Digital Signal Processor (DSP), an Application Specific Integrated Circuit (ASIC), a Field Programmable Gate Array (FPGA) or other programmable logic devices, discrete gates, transistor logic devices, or discrete hardware components that can realize or implement various methods, steps, and logic blocks disclosed in the embodiments of the present disclosure. The general-purpose processor may be a microprocessor or the processor 330 also may be any conventional processor and so on.

It should be noted that various embodiments in the present description are described in a progressive manner, each embodiment focuses on the differences from other embodiments, and the same or similar parts between various embodiments may refer to each other.

In the several embodiments provided in the present disclosure, it should be understood that the device and the method disclosed may be implemented in other manners. The device embodiments described above are merely illustrative, for example, the flowcharts and the block diagrams in the drawings show possible system architectures, functions, and operations of the device, method, and computer program products according to multiple embodiments of the present disclosure. In this regard, each block in the flowcharts or the block diagrams may represent a part of a module, a program segment, or a code, and the part of the module, the program segment, or the code contains one or more executable instructions used to realize a specified logical function. It also should be noted that in some implementations as substitutions, the functions indicated in the blocks also may occur in an order different from that indicated in the drawings. For example, two continuous blocks practically may be executed substantially in parallel, and they sometimes also may be executed in a reverse order, which depends upon a function involved. It also should be noted that each block in the block diagrams and/or flowcharts, and combinations of the blocks in the block diagrams and/or the flowcharts may be realized by a dedicated hardware-based system configured to execute a specified function or action, or may be realized by a combination of dedicated hardware and computer instructions.

Besides, the various functional modules in various embodiments of the present disclosure may be integrated together to form one independent portion, and it is also possible that the various modules exist independently, or that two or more modules are integrated to form one independent part.

If the function is realized in a form of system function module and is sold or used as an individual product, it may be stored in one computer readable storage medium. Based on such understanding, the technical solutions in essence or parts making contribution to the prior art or parts of the technical solutions of the present disclosure may be embodied in the form of a system product, and this computer system product is stored in a storage medium, including several instructions for making one computer device (which may be a personal computer, a notebook computer, a server or a network device etc.) execute all or part of the steps of the methods provided in various embodiments of the present disclosure. The foregoing storage medium includes various media in which program codes can be stored, such as U disk, mobile hard disk, Read-Only Memory (ROM), Random Access Memory (RAM), diskette and compact disk.

The above-mentioned are merely specific embodiments of the present disclosure, but the scope of protection of the present disclosure is not limited thereto, and changes or substitutions that may be easily envisaged by those skilled in the present art within the technical scope disclosed in the present disclosure should fall within the scope of protection of the present disclosure. Therefore, the scope of protection of the present disclosure should be based on the scope of protection of the claims.

Moreover, based on the same inventive concept as the above method embodiment, an embodiment of the present disclosure further provides a computer program product, wherein the computer program product, when running on a computer, may execute the method related to in the above method embodiment of the present disclosure.

In the above, it should be noted that all of the electronic device, the computer storage media, and the computer program product provided in the embodiments of the present disclosure may be configured to execute the corresponding methods provided in the above embodiments, therefore, the beneficial effects that can be achieved may refer to the corresponding methods provided in the above, which will not be repeated herein.

Finally, it should be noted that the above-mentioned are merely part of the embodiments of the present disclosure, rather than being intended to limit the present disclosure. While the detailed description is made to the present disclosure with reference to the preceding embodiments, those skilled in the art should understand that they still could modify the technical solutions recited in various preceding embodiments, or make equivalent substitutions to some of the technical features therein. Any modifications, equivalent substitutions, improvements and so on, within the spirit and principle of the present disclosure, should be covered within the scope of protection of the present disclosure.

INDUSTRIAL APPLICABILITY

As the technical solution of breakpoint backup or breakpoint restoration is adopted, a complete data task can be split into a plurality of single-orbit tasks to be executed in orbits, so as to realize the backup or restoration of the satellite on-orbit system, further solving the problem that some other backup manners cannot realize the on-orbit backup or restoration operation.

In addition, the task can be quickly split into a plurality of single-orbit tasks according to the total duration of executing the data task and the estimated duration allowed to execute the data task in one orbital flight of the satellite, thereby simplifying the splitting process.

Furthermore, according to the duration allowed to execute the data task in each orbital flight and the remaining data task amount of the data task, the data task is split into a plurality of single-orbit tasks, so that when the data task is split into a plurality of single-orbit tasks, the difference between the durations allowed to execute the data task in different orbital flights can be sufficiently considered, then resources can be more reasonably used, so that the splitting effect is more efficient.

Furthermore, the start flag bit for executing the data backup or the data restoration in a single-orbit task is recorded in the present orbital flight, and the end flag bit is recorded when the execution is completed, so that when the data backup or the data restoration in the single-orbit task is executed in the next orbital flight, there are traces to follow, to realize the backup or restoration of the satellite on-orbit system, further solving the problems existing in some other backup modes.

What is claimed is:

1. A satellite data processing method, applicable to a satellite backup subsystem, wherein the method comprises:
   receiving a data task, wherein the data task comprises data backup or data restoration;
   splitting the data task into a plurality of single-orbit tasks; and
   executing respective single-orbit task in each orbital flight,
   wherein the step of splitting the data task into a plurality of single-orbit tasks comprises:
      acquiring a total duration required to execute the data task;
      estimating a duration allowed to execute the data task in one orbital flight of the satellite; and
      splitting the data task into a plurality of single-orbit tasks based on the total duration and the duration allowed to execute the data task in one orbital flight of the satellite.

2. The satellite data processing method according to claim 1, wherein the step of estimating a duration allowed to execute the data task in one orbital flight of the satellite comprises:
   estimating the duration allowed to execute the data task in one orbital flight of the satellite according to an average value of durations used to execute the data backup or the data restoration in each orbital flight of the satellite at a plurality of historical moments.

3. The satellite data processing method according to claim 1, wherein the step of splitting the data task into a plurality of single-orbit tasks comprises:

splitting the data task into a plurality of single-orbit tasks, according to a duration allowed to execute the data task in each orbital flight and a remaining data task amount of the data task.

4. The satellite data processing method according to claim 3, wherein the step of splitting the data task into a plurality of single-orbit tasks according to a duration allowed to execute the data task in each orbital flight and a remaining data task amount of the data task comprises:

determining a duration allowed to execute the data backup or data restoration operation in present orbital flight according to electric quantity of the satellite and the remaining data task amount to be backed-up or restored in a previous orbital flight;

calculating a duration required by a remaining data task of the data task;

judging whether the duration allowed to execute the data backup or data restoration operation in the present orbital flight is less than the duration required by the remaining data task amount of the data task, wherein if the duration allowed to execute the data backup or data restoration operation in the present orbital flight is less than the duration required by the remaining data task of the data task, remaining data of the data task is split into a single-orbit task that needs to be executed in the present orbital flight and a data task remaining after subtracting the single-orbit task that needs to be executed in the present orbital flight, according to the duration allowed to execute data backup or data restoration operation in the present orbital flight; and if the duration allowed to execute the data backup or data restoration operation in the present orbital flight is not less than the duration required by the remaining data task of the data task, the single-orbit task that needs to be executed in the present orbital flight is the remaining data task of the data task.

5. The satellite data processing method according to claim 1, wherein the step of executing respective single-orbit tasks comprises:

recording a start flag bit of the data backup or the data restoration in the presently executed single-orbit task;

executing the data backup or the data restoration in the single-orbit task, from the start flag bit of the data backup or the data restoration in the single-orbit task; and recording, when completing execution of the data backup or the data restoration in the corresponding single-orbit task, an end flag bit when the execution is completed.

6. The satellite data processing method according to claim 5, wherein the step of recording a start flag bit of the data backup or the data restoration in the presently executed single-orbit task comprises:

checking in a file whether an end flag bit of data backup or data restoration representing a nearest time point to the present orbital flight is recorded, wherein if the end flag bit of data backup or data restoration representing the nearest time point to the present orbital flight is recorded in the file, the start flag bit of the presently executed data backup or data restoration starts to be recorded from a corresponding end flag bit in the last time; and if the end flag bit of data backup or data restoration representing the nearest time point to the present orbital flight is not recorded in the file, the start flag bit of the presently executed data backup or data restoration is recorded.

7. The satellite data processing method according to claim 1, wherein the step of receiving a data task comprises:

receiving a data task instruction from the ground station, wherein the data task instruction carries a device identifier, and the device identifier is used to indicate a device on which the data task is to be executed;

sending to the ground station an inquiry request whether there is a need to execute the data task on the device corresponding to the device identifier; and indicating that the data task is received, when receiving a confirmation instruction sent by the ground station in response to the inquiry request.

8. The satellite data processing method according to claim 1, wherein in the process of executing the single-orbit task, the method further comprises:

stopping execution of the current single-orbit task when it is monitored that a power supply voltage continuously falls or falls to a set threshold.

9. A satellite backup subsystem, comprising a standby memory and a processor, wherein the standby memory is connected with the processor;

the standby memory is configured to store backup data; and the processor has a computer program solidified therein, and the processor is configured to execute a satellite data processing method by running the computer program, wherein the satellite data processing method is applicable to the satellite backup subsystem, and comprises:

receiving a data task, wherein the data task comprises data backup or data restoration;

splitting the data task into a plurality of single-orbit tasks; and executing respective single-orbit task in each orbital flight, wherein the step of splitting the data task into a plurality of single-orbit tasks comprises:

acquiring a total duration required to execute the data task;

estimating a duration allowed to execute the data task in one orbital flight of the satellite; and splitting the data task into a plurality of single-orbit tasks based on the total duration and the duration allowed to execute the data task in one orbital flight of the satellite.

10. A non-transitory computer readable storage medium, wherein the readable storage medium is stored thereon with a computer program, and the computer program executes, when run by a processor, a satellite data processing method, wherein the satellite data processing method is applicable to the satellite backup subsystem, and comprises:

receiving a data task, wherein the data task comprises data backup or data restoration;

splitting the data task into a plurality of single-orbit tasks; and executing respective single-orbit task in each orbital flight, wherein the step of splitting the data task into a plurality of single-orbit tasks comprises:

acquiring a total duration required to execute the data task;

estimating a duration allowed to execute the data task in one orbital flight of the satellite; and splitting the data task into a plurality of single-orbit tasks based on the total duration and the duration allowed to execute the data task in one orbital flight of the satellite.

11. The satellite data processing method according to claim 4, wherein the step of executing respective single-orbit tasks comprises:

recording a start flag bit of the data backup or the data restoration in the presently executed single-orbit task;

executing the data backup or the data restoration in the single-orbit task, from the start flag bit of the data backup or the data restoration in the single-orbit task; and recording, when completing execution of the data backup or the data restoration in the corresponding single-orbit task, an end flag bit when the execution is completed.

12. The satellite data processing method according to claim 11, wherein the step of recording a start flag bit of the data backup or the data restoration in the presently executed single-orbit task comprises:

checking in a file whether an end flag bit of data backup or data restoration representing a nearest time point to the present orbital flight is recorded, wherein if the end flag bit of data backup or data restoration representing the nearest time point to the present orbital flight is recorded in the file, the start flag bit of the presently executed data backup or data restoration starts to be recorded from a corresponding end flag bit in the last time; and if the end flag bit of data backup or data restoration representing the nearest time point to the present orbital flight is not recorded in the file, the start flag bit of the presently executed data backup or data restoration is recorded.

13. The satellite data processing method according to claim 2, wherein in the process of executing the single-orbit task, the method further comprises:

stopping execution of the current single-orbit task when it is monitored that a power supply voltage continuously falls or falls to a set threshold.

14. The satellite data processing method according to claim 3, wherein in the process of executing the single-orbit task, the method further comprises:

stopping execution of the current single-orbit task when it is monitored that a power supply voltage continuously falls or falls to a set threshold.

15. The satellite data processing method according to claim 4, wherein in the process of executing the single-orbit task, the method further comprises:

stopping execution of the current single-orbit task when it is monitored that a power supply voltage continuously falls or falls to a set threshold.

16. The satellite data processing method according to claim 6, wherein in the process of executing the single-orbit task, the method further comprises:

stopping execution of the current single-orbit task when it is monitored that a power supply voltage continuously falls or falls to a set threshold.

17. The satellite data processing method according to claim 7, wherein in the process of executing the single-orbit task, the method further comprises:

stopping execution of the current single-orbit task when it is monitored that a power supply voltage continuously falls or falls to a set threshold.

18. The satellite data processing method according to claim 12, wherein in the process of executing the single-orbit task, the method further comprises:

stopping execution of the current single-orbit task when it is monitored that a power supply voltage continuously falls or falls to a set threshold.

* * * * *